3,330,886
GRAFT COPOLYMERS OF POLYVINYL CHLORIDE WITH BUTADIENE, ACRYLATE ESTER AND DI-ETHYLENIC COMPOUND
Marcel Riou, Neuilly-sur-Seine, and Jean-Marie Michel, Champigny-sur-Marne, France, assignors to Pechiney Compagnie de Produits Chimiques et Electrometallurgiques, Paris, France, a corporation of France
No Drawing. Filed Apr. 5, 1965, Ser. No. 445,769
Claims priority, application France, Aug. 7, 1959, 802,321
12 Claims. (Cl. 260—879)

This application is a continuation-in-part of application 47,149, filed Aug. 3, 1960, now abandoned.

The present invention relates to new improved graft copolymers obtained by grafting a mixture of butadiene and an alkyl acrylate or methacrylate to polyvinyl chloride.

A number of graft copolymers have been known for a long time. Graft copolymers consist of a main chain, called a trunk, onto which are grafted side chains, or branches, of a different chemical structure. Various methods of grafting are discussed in the prior art including grafting by chain transfer, ozonization, irradiation, radiochemical peroxidation, etc. Using these processes in these ways it was possible in these ways to graft onto any type of synthetic polymer any and all types of copolymerizable monomers or mixture of monomers. In spite of these generalizations, the preparation and study of only a small number of the theoretically foreseen graft polymers have been carried out effectively. Moreover the characteristics of graft polymers differ very greatly from those of copolymers obtained by simultaneous polymerization of the monomers and from those of mixtures of the corresponding homopolymers. Thus, it is not possible to foresee the precise properties of the graft polymers which have not yet been prepared, though the general processes for their preparation have been already forecast.

The graft polymers of this invention contain a polyvinyl chloride type polymer trunk having branches formed from a mixture of butadiene and an acrylic monomer such as various alkyl acrylates including methyl acrylate and methyl methacrylate monomers.

It is known that the addition of plasticizing agents to polyvinyl chloride lowers its elasticity modulus and improves many of its physical properties; however, it is known that many of these desirable properties, such as flexibility, gradually disappear in a given period of time and due to plasticizer migration the polymer becomes brittle.

It is an object of the invention to lower the elasticity modulus of polyvinyl chloride polymers without the addition of a plasticizing agent and hence to secure either flexible products of very low elasticity modulus, or semi-stiff to stiff impact resistant products of relatively high elasticity modulus, yet still lower than that of polyvinyl chloride and other polyvinyl graft copolymers.

Another object of this invention is to provide a polyvinyl chloride graft polymer process that does not require a chain transfer agent.

Another object of this invention is to produce polyvinyl chloride-butadiene-acrylate graft polymers that have improved solubility characteristics.

We have discovered that when a mixture of butadiene and acrylic monomers is grafted to long chain polyvinyl chloride trunks in the presence of a polymerization initiator the above objects are obtained, and that particularly desirable polyvinyl chloride-butadiene-acrylate graft polymers are produced when the trunk to monomer mixture ratio is 80/20 to 40/60 and the monomer mixture is grafted to the trunk in the presence of a catalyst. The polymers conforming to these ratios can be produced having a wide range of tensile strength, impact resistance, ideal degrees of internal plasticization and excellent machinability.

We have also discovered that the polymers produced in accordance with this invention maintain their desirable properties for an indefinite time and that plasticizer migration is no longer a problem.

In accordance with the invention, the polyvinyl chloride used is prepared beforehand, according to known processes, as a solution, a solid product, a suspension or an emulsion, either in the presence of a catalyst, such as a peroxide catalyst or in the presence of ionizing radiation. The conditions under which the polyvinyl chloride are prepared have an influence on the pyhsical properties of the final graft copolymer. Generally speaking, when the polyvinyl chloride is prepared at a low temperature, longer chains and very high molecular weights are obtained, and the graft polymer has better physical properties than a similar product prepared from polyvinyl chloride with shorter chains and relatively lower molecular weights.

The composition and proportions of the mixture of monomers used for grafting play an important part in determining the properties exhibited by the product and greatly effect the degree of internal plasticization of the product.

Butadiene confers special properties to the final copolymer, for example, it lowers the softening temperature and increases the impact resistance of polyvinyl chloride per se. Due to the presence of residual unsaturation in the side chains of the graft copolymer, the latter is subject to cross-polymerization. However, this unsaturation may make the product sensitive to reaction with oxygen when the grafting has been carried out with high proportions of diolefin. In order to eliminate this drawback one may add the conventional antioxidant materials well known in the chemistry of elastomers.

The amount of acrylic monomer with only one vinylic double bond added to the butadiene greatly modifies the final product. The acrylic monomer plays a double part in forming the graft copolymer. On the one hand, it increases the grafting speed, on the other hand, by copolymerizing with butadiene, it introduces into the macromolecule specific characteristics due to its structure, which improve the physical and mechanical properties of the resin product.

The exact proportions of conjugated diolefin and copolymerizable monomer is not critical. The proportions used depend on the qualities which are desired in the final product. However, the balanced characteristics of the graft copolymer are not obtained unless important quantities of both butadiene and acrylic monomer are present when forming the graft polymer. In general the proportion of conjugated diolefin may be between 5 and 90% of the monomer mixture but a proportion between about 20 and 80% is preferred. Correspondingly, of course, the proportions of acrylic monomer would vary between 95 and 10% and preferably between about 80 and 20%.

Similarly, the exact proportion of monomers in relation to the trunk polymer is not critical. However, as the qualities of the grafted product are determined both by the trunk polymer and the branch monomers which are attached to the trunk, it is preferable not to make the percentage of trunk polymer too small as compared to the whole of the formed copolymer. In general, with a proportion such that the mass of the branches lies between 10 and 50% of the total mass of the graft polymer it is possible to obtain a series of products ranging well over the field of physical and chemical properties which it is desired to confer to the polymer. Preferably the graft copolymer contains branch chains representing 20 to 50% of the weight of the polymer.

In order to graft the mixture of butadiene monomer and acrylic monomers upon the polyvinyl chloride trunk, any known catalytic method may be used. For example, chain transfer grafting in the presence of a conventional chemical or polymerization initiator, either a radical or ionic initiator works well. And also one may use irradiation grafting by means of ionizing radiations such as gamma radiation of cobalt-60, with a dosage rate less than 50,000 rad/hour, the latter process being advantageous in that it does not incorporate foreign matter into the polymer. In all cases, grafting reactions may be carried out in a suspension or an emulsion. In general, grafting is effected in a freshly prepared suspension or emulsion of polyvinyl chloride in the presence of a polymerization initiator; the initiator may be introduced with the monomer mixture or shortly after the monomer mixture, both operations being carried out successively in the same apparatus.

It may be necessary or desirable, in the course of the different operations leading to the production of the final graft polymers, to introduce with the monomer mixture, various agents selected from the group of vinyl and vinylidene monomers consisting of divinylbenzene, divinylether, monoalkyleneglycol dimethacrylate, polyalkyleneglycol-dimethacrylate, monoalkyleneglycol diacrylate, polyalkyleneglycol diacrylate, allyl acrylate, allyl methacrylate, allyl phthalate, allyl cyanurate, methacrylamide, cyanomethacrylate, thiomethacrylate, 1,1-dichlorethylene, 1-bromo 1-chloro ethylene, vinylacetate, vinylpyridine, methylstyrene, dimethylstyrene, alphachlorostyrene, dichlorostyrene, cyanostyrene, methoxystyrene, vinyl-naphthalene; maleic and fumaric esters, chloromaleic and chlorofumaric esters; the proportions of these various agents range up to 10% by weight, such as for instance between 0.5 and 10% by weight and preferably between 1 and 5% by weight of the monomer mixture. An advantage of introducing in the polymer such components is in relation with the specific character of their structure and in particular to the chemical functions they bear.

In current procedure of polymerization, it is usual to add a chain transfer against such as a mercaptan; but this is a disadvantage of the prior art, since it confers an odor to the final product, it decreases the rate of grafting and it constitutes an impurity.

According to the invention, we do not add a chain transfer agent.

The properties of the graft polymers of the instant invention are quite different from those of polyvinyl chloride per se and can be varied by varying the length of polyvinyl chloride chain, the acrylic monomer used in copolymerization with the butadiene, and the proporations by weight of the monomers relative to another another and their overall proportions compared to the quantity of polyvinyl chloride.

Broadly speaking, different types of polymers may be prepared by varying the proportion of butadiene to acrylic monomer. For example, one may produce stiff or semi-stiff products by keeping the proportion of the diene monomer in the final product below 15%, this being an approximate figure which greatly depends on the other comonomer utilized. The stiff and semi-stiff polymers are readily worked up on a calender mixed between rolls. Their tensile modulus is in the order of 12,000 to 15,000 kg./cm.² They are transparent. They have a softening temperature comparable with that of a non-grafted polyvinyl chloride. They have an excellent and greatly superior impact resistance. When measuring the impact resistance by Charpy method on notched bars, values generally higher than 100 kg./cm./cm.² are obtained. By way of comparison, a stiff polyvinyl chloride exhibits an impact resistance of 5 to 10 kg./cm./cm.² under the same conditions.

Flexible products may be produced by keeping the proportion of diene monomer in the final polymer higher than 15%, but the exact composition also depends on the comonomer used. For example, if a mixture of butadiene and ethyl acrylate is grafted, the graft polymer will be a flexible polymer for a butadiene ethyl acrylate ratio of 1/3 resulting in 10% of butadiene in the final product. Under the same conditions, polymer obtained on replacing ethyl acrylate by methyl methacrylate is a stiff product with high softening point.

Flexible polymers of this invention are transparent and they retain their flexibility even at every low temperatures.

The grafted polymers of this invention are not limited to those of the plastic masses obtained after coagulation and processing of latices. The latices themselves present specially interesting and sought for qualities. When the proportion of butadiene in the latices is approximately 15% or more the prepared latices are film forming in the cold or at room temperature. This means that a coating of the latices on a glass plate, for instance, after being permitted to dry by evaporation, forms thereon a thin, adherent flexible film which exhibits good mechanical properties. Of ocurse, the exact proportion of 15% is not critical; it depends, particularly on the kind of other monomer.

The qualities of the films are related to the percentage of the diene and to the total quantity of branch monomers and to the type of comonomers utilized. Therefore, various procedures are available for modifying the properties of the film with regard to the desired application. The latices of this invention have many uses. For example, they may be used in the manufacture of paints and stiffenings, the sizing of paper, the preparation of non-woven fabrics, etc.

The graft polymers of this invention are capable of cross-linking due to the presence of double bonds on the side chains. This makes it possible to improve the mechanical properties of the finished articles.

The following purely illustrative examples are intended to illustrate the method by which the graft copolymers of the instant invention are produced and their importance, but they are not to be considered a limitation upon the invention. Where not otherwise stated, parts and percentages are expressed in parts by weight and percentages by weight.

*Examples 1 to 3*

(a) Nine (9) liters of deionized water, 2.5 kg. of vinyl chloride monomer and 25 g. of a long chain fatty acid sulfate acting as an emulsifier, were introduced into a 20 liter stainless steel autoclave which had a stirrer and a device enabling one to introduce inside the autoclave a stick of radioactive cobalt, sheathed with stainless steel, having a power corresponding to 130 curies. Under such conditions, the average dosage rate is 10,000 rad/hour.

The temperature of the reaction mass was raised to 60° C. and the radioactive source was introduced into the autoclave. The polyvinyl chloride was thereby radiopolymerized until the beginning of a decrease in pressure was observed. The reaction was continued for an additional ½ hour, then the radioactive source was removed and the autoclave was blown out with nitrogen. A polyvinyl chloride latex was obtained with a molecular weight of the order of 60,000 and a intrinsic viscosity of 0.9.

(b) Upon lowering the temperature to 50° C., a mixture of freshly distilled butadiene and ethyl acrylate was introduced in the following proportions:

| | G. |
|---|---|
| Test A—butadiene-ethyl acrylate | 500/1500 |
| Test B—butadiene-ethyl acrylate | 800/1200 |
| Test C—butadiene-ethyl acrylate | 1000/1000 |

Irradiation was carried forward at 50° C. until zero pressure was observed in the autoclave. The latices obtained were all film forming at relatively cold or hot temperatures, and films obtained by evaporating the latices on a glass plate had good mechanical properties.

The latices were coagulated according to the usual practice, washed and dried at 50° C. The dry graft polymers had the appearance of rubber masses which were worked up very easily. Working at a low temperature (80° C.) produced flexible, transparent sheets that had excellent tear resistance.

In order to further illustrate the properties of these polymers, the characteristics of some of them have been set out in the table below. They have been compared with those of a polyvinyl chloride which had been plasticized with 40% dioctyl phthalate and had a viscosity of 0.8.

|  | Tensile modulus, kg./cm.$^2$ | Tensile strength, kg./cm.$^2$ | Elongation, Percent | Temperatures at which the following elasticity modulus were obtained | | |
|---|---|---|---|---|---|---|
|  |  |  |  | 9,450 kg. | 700 kg. | 125 kg. |
| Test A | 112 | 93 | 150 | −20.5° | +6° | +27° |
| Test B | 200 | 72 | 335 | −41° | −5° | +43.5° |
| Test C | 264 | 61 | 355 | −52° | −16.5° | +53.5° |
| Plasticized PVC |  |  | 125 | 270 | −38° | −11° |

From the above table we learn that substituting butadiene for increasing quantities of ethyl acrylate considerably improves the resistance of the graft polymer at cold and increases the elongation and the tensile modulus. Tests B and C show properties comparable to those of the polyvinyl chloride plasticized with 40% dioctyl phthalate. Tensile strength is slightly lower but elongation and resistance to the cold are improved.

When comparing these graft polymers with the plasticized polyvinyl chloride, it is important to realize that these polymers possess a tremendous advantage since the plasticizing effect is a permanent one and there can be no plasticizer migration.

The following tests show the special solubility properties of the grafted products.

Samples of polymers A, B and C were placed in a filter paper cartridge and extracted for 200 to 300 hours with different solvents, in a Kumagawa apparatus:

With methanol, sample A was 97% extracted while only 1% of samples B and C was extracted.

With hexane, the extraction rate was 0.7 to 0.8% for the three samples.

With tetrahydrofurane, sample A was 100% extracted while sample B was 65% extracted and sample C was 50% extracted.

*Examples 4 to 6*

The following examples illustrate the properties of grafted products when the monomer/polymer ratios are varied, and the components of the monomer mixture remain unchanged.

The latices were prepared under conditions identical to those set out in paragraphs (a) and (b) of Examples 1 to 3 except that the graft copolymer was prepared from a mixture of monomers containing an equivalent proportion by weight of butadiene and ethyl acrylate.

The products prepared were shown by quantitative analysis of chlorine in the final product, to have the following percentages of grafted branch monomers: Test D—18%, Test E—28%, Test F—43%.

The latex of Test D was film forming when hot but not when cold. Polymer D was processed at a high temperature (175° C). It was a hard product with a distortion temperature under load of 67° C. and a very high impact resistance, which exceeded 80 kg./cm./cm.$^2$. By way of comparison, the characteristics of a stiff high impact resistant polyvinyl chloride (mixed with 4% butadiene acrylic nitrile copolymers) had distortion temperature under load 70° C.; impact resistance 100 kg./cm./cm.$^2$.

The latices of Tests E and F were film forming when hot and when cold. Polymer E was easily processed at the relative low temperature of 105° C. It was a semi-stiff product, with an elasticity modulus of 9,450 kg./cm.$^2$ at 20° C. Polymer F was processed at a very low temperature of 80° C. and readily worked up into flexible sheets.

It exhibited the mechanical properties shown in Test C indicated in Examples 1 to 3.

Therefore, it is readily seen that by progressively increasing the graft monomer/trunk polymer ratio it is possible to obtain in succession, stiff polymers with a very high impact resistance, semi-stiff polymers and very flexible polymers which may be used in the same applications as plasticized polyvinvy chlorides, but which have properties which are much more stable. For example, practically all plasticized polyvinyl chlorides ultimately lose their plasticity due to the migration of the plasticizers but the molecularly bound graft monomers of this invention are chemically bound in the molecule.

*Example 7*

A latex of polyvinyl chloride was prepared as described in paragraph (a) of Examples 1 to 3. After the autoclave had been blown out with nitrogen gas, a mixture of 250 g. of butadiene and 750 g. of methyl methacrylate were introduced. After swelling had occurred, the latex was irradiated at 50° C. Polymerization was rapid, within 100 minutes, a conversion percentage of about 80% was ascertained. The latex obtained was film forming at 100° C. but not at room temperature and the film obtained was rather brittle.

The latex was coagulated and the polymer was washed and dried as described hereabove. This polymer was worked up very easily on a calender at 135° C. Its mechanical properties were: Tensile modulus—16,000 kg./cm.$^2$, Strength—340, Elongation (percent)—175, Distortion Temperature under load—50° C., and it had an impact resistance higher than that of pure polyvinyl chloride.

*Example 8*

The procedure was carried out exactly as in the preceding example, using the following proportions of monomer: butadiene 600 g. and methyl methacrylate 400 g. The tensile modulus of the resulting graft polymer was slightly lowered to 11,700 kg./cm.$^2$ but the impact resistance was very greatly increased to more than 80 kg./cm./cm.$^2$.

*Example 9*

A latex of polyvinyl chloride was prepared by usual method in a 5 liter stainless steel autoclave using a sodium-persulfate-sodium metabisulfite couple as the initiator. The quantity of vinvyl chloride taken up was about 850 g. of 3 liters of deionized water.

After polymerization, the unpolymerized vinyl chloride was removed as a gas and the autoclave was blown off with a current of pure nitrogen and the temperature was lowered to 20° C. Then an aqueous solution containing 6 g. of sodium pyrophosphate, 6 g. of glucose, 0.6 g. of ferrous sulfate dissolved in 100 cm.$^3$ of water was introduced under an atmosphere of nitrogen. This solution was dispersed in the latex, and then a mixture of 340 g. of ethyl acrylate, 340 g. of butadiene and 3 g. of cumene hydroperoxide was introduced.

Swelling was allowed to take place for ½ hour at 20° C.; then the temperature was raised to 40° C. where it was maintained for about 18 hours. Under such conditions the extent of the grafting obtained was of the order of 35 to 40%.

The latex thus obtained was film forming at room temperature and gave films having good mechanical properties. The polymer obtained was easily worked up on a calender at 80° C., and transparent, flexible films, similar to those of polyvinyl chloride plasticized with 40% of a plasticizer such as dioctyl phthalate were obtained. The plasticizing effect was a permanent one.

The mechanical properites were equivalent to those reported in Examples 1 to 3 for a graft polymer of same composition, but prepared by radiochemical means. The tensile modulus was 250 kg./cm.$^2$, the tensile strength 70 kg./cm.$^2$, the elongation 300%. The elasticity modulus was 125 kg./cm.² at 55° C., 700 kg./cm.² at −15° C. and 9,450 kg./cm.² at −48° C.

When comparing the product of this example with a polyvinyl chloride, plasticized with 40% dioctyl phthalate (the mechanical characteristics of which have been shown in Examples 1 to 3), the polymer obtained by grafting with the butadiene-ethyl acrylate mixture has equivalent properties and even better ones where resistance at low temperatures is concerned.

*Example 10*

(a) Into a 200 liter stainless steel autoclave were charged at 20° C., 90 liters of deionized water, 250 g. of sodium lauryl sulfate, 14 g. of potassium persulfate and 7 g. of metabisulfite.

The solution was degassed under nitrogen by carrying out 10 compression cycles followed by expansion. After degassing, 25 kg. of vinyl chloride monomer were charged into the reactor, the temperature rose to 60° C. and the reaction was continued at that temperature. When the pressure inside the autoclave reached 3 kg., the residual monomer was degassed and the latex and bubbling inert gas was blown through the reactor.

(b) After the temperature was reduced to 20° C., the following solutions were successively introduced about every ¼ hour: 250 cm.³ of a 10% sodium hydroxide solution; a solution, boiled and cooled under nitrogen, of 100 g. of sodium pyrophosphate decahydrate in 2,000 cm.³ of water; a solution of 0.9 g. nonahydrated ferric nitrate solution and 100 g. of glucose in 500 g. boiled water.

After suitable agitation, a mixture of 5 kg. of butadiene and 5 kg. of methyl methacrylate, freed of an inhibitor, and 3.6 g. of cumene hydroperoxide was introduced. The temperature rose to 40° C. and the reaction was continued until 1 kg. of pressure was reached. Then, a solution of 3 kg. of hydroquinone in 20 cm.³ alkaline water was introduced and the residual monomers were removed by degassing and bubbling in of nitrogen. After cooling this solution down, the latex of graft polymers was mixed with a dispersion of a trinonylphenylphosphite anti-oxidant.

After coagulation, the polymer was washed and dried. It had the appearance of a fine powder; it was worked up on cylinders at a relatively low temperature and gave semi-stiff sheets, the tensile modulus of which were of the order of 15,000 kg./cm.² and the tensile strength of which were of the order of 250 kg./cm.². The softening point was between 65–70° C. The resistance to impact was higher than 100 kg./cm./cm.².

*Example 11*

A polyvinyl chloride latex was prepared as indicated in paragraph (a) of Example 10. The grafting reaction was carried out as indicated in paragraph (b), but the quantities of methyl methacrylate, butadiene and the catalytic system were doubled.

The polymer obtained was flexible, had a low tensile modulus and mechanical behavour comparable with that of a sample of polyvinyl chloride plasticized with 40% dioctyl phthlate.

The series of polymers one may prepare in this way is quite large, extending from stiff products having properties bordering on those of the initial polyvinyl chloride to very flexible products having a very low tensile modulus. Such properties depend upon the relative quantity of the grafted monomers, as illustrated by Examples 10 and 11, and also upon the methacrylate/butadiene ratio. Thus, in the present example when one uses the same total quantity of monomer but with a butadiene/methacrylate mixture of 1/3, instead of 1/1, the copolymer obtained was semi-stiff, the softening point was 35 to 45° C. and the tensile modulus was 10,000 kg./cm.².

The foregoing general description and examples show that in order to modify the trunk polymer to impart the desired balanced properties the mixture of monomers reacted with the trunk polymer to graft side chains thereon must contain substantial quantities of both butadiene and acrylic monomers. Generally speaking, the mixture must contain from 5 to 90% butadiene and from 95 to 10% acrylic monomer and preferably the respective percentages should range between 20 and 80% and 80 and 20%, and the trunk polymer must be reacted with significant quantities of the mixture if it is to be significantly modified. In general, the mixture is used in a quantity sufficient to introduce branch chains equaling 10 to 50%, and preferably 20 to 50%, of the resulting graft polymer.

While the foregoing examples have illustrated homopolymers of vinyl chloride, it should be well recognized that the functional radical is the chloride radical which is present not only in homopolymers of vinyl chloride but is also present in homopolymers of vinylidene chloride and copolymers formed from vinyl chloride monomers and other ethylenically unsaturated compounds including esters, such as vinyl esters, fumaric esters, maleic esters, acrylic esters, and halogenated vinyl monomers.

The following purely illustrative example will illustrate the method by which such graft polymers are produced.

*Example 12*

(a) Nine (9) liters of deionized water, 2.0 kg. of vinyl chloride monomer, 0.5 kg. of freshly distilled vinyl acetate and 25 g. of lauryl and sodium sulfate, acting as an emulsifier, were introduced into a 16 liter stainless steel autoclave. This emulsion was radiopolymerized, in the manner set forth in Example 1, at a temperature of about 60° C., until the pressure inside the autoclave reached 3 kg./cm.². The remaining monomers were then removed by blowing them out with pure nitrogen; the latex obtained was cooled to about 50° C.

A mixture consisting of 1000 g. of butadiene and 1000 g. of methyl methacrylate was introduced into the autoclave and the emulsion was radiopolymerized after swelling for about 1 hour; the radiopolymerization was stopped when the pressure inside the autoclave reached 1 kg./cm.² and the emulsion was cooled to 20° C., after degassing.

An emulsion consisting of 15 g. of trinonylphenylphosphite in 1500 cm.³ of water, containing 1.5 g. of sodium lauryl sulfate was added to coagulate the latex, then washed and dried (Polymer G).

(b) Polymer H is prepared according to the method set forth in paragraph (a) but the temperature for radiopolymerizing the vinyl chloride-vinyl acetate copolymer is about 0° C.

The following table illustrates properties of these copolymers.

| | Tensile strength, kg./cm.² | Elongation, Percent | Temperatures at which the following elasticity modulus were obtained | | |
|---|---|---|---|---|---|
| | | | 9,450 kg. | 700 kg. | 125 kg. |
| Polymer G | 100 | 150 | −30° C. | 74° | 91° |
| Polymer H | 150 | 245 | −45° | 23° | 70° |

The following examples illustrate the addition of divinylbenzene, polyethyleneglycol diacrylate and polyethyleneglycol dimethacrylate to the butadiene-acrylate monomer mixture.

*Example 13*

The procedure of Example 9 was followed except that to the monomer mixture of ethyl acrylate (340 g.) and butadiene (340 g.) was added 20 g. of divinylbenzene.

After coagulating the latex, and drying the polymer it was easily calendered to obtain flexible, transparent and very smooth sheets.

*Example 14*

The steps of Example 13 were repeated except that the same weight of polyethyleneglcol dimethacrylate was used in place of divinylbenzene and the same results were obtained.

In both Examples 13 and 14, the grafted polymers are entirely soluble in dichlorethane and their fractional precipitation curves are different from their linear polymer constituents, i.e. polyvinylchloride homopolymer and butadiene ethylacrylate copolymer.

*Example 15*

The procedural steps of Example 7 are followed except that 20 g. of divinylbenzene are added to the monomer mixture of butadiene (250 g.) and methyl methacrylate (750 g.). The polymer obtained after coagulation of the latex, filtration, washing and drying has substantially the same mechanical properties of the polymer obtained in Example 7. However, sheets after calendering, or sections obtained by extrusion have a much smoother surface and are much more shiny and uniform in appearance.

*Example 16*

The steps of Example 15 were repeated, except that the same weight of polyethylene glycol diacrylate was used in place of divinylbenzene. The results obtained are the same.

*Example 17*

The steps of Example 10 were repeated, except that 0.4 kg. of divinylbenzene (in the form of a 55% by weight solution) was added to the monomer mixture of butadiene (5 kg.) and methyl methacrylate (5 kg.).

After treating the latex as in the foregoing examples, the polymer was obtained in fine powder form which when worked up gives stiff articles of a shiny and non-granular surface.

*Example 18*

The steps of Example 17 were repeated, except that the same weight of polyethyleneglycol dimethacrylate was employed in place of divinylbenzene. The results obtained were the same.

We claim:

1. A graft polymer which comprises the graft polymer obtained by reacting a polyvinyl chloride with a monomer mixture composed of about 20 to 80% by weight of butadiene and about 80 to 20% by weight of an acrylic monomer selected from the group consisting of alkyl acrylates and alkyl methacrylates, and a member of the group of vinyl and vinylidene monomers consisting of divinylbenzene, divinylether, monoalkyleneglycol, dimethacrylate, polyalkyleneglycol dimethacrylate, monoalkyleneglycol diacrylate, polyalkyleneglycol diacrylate, allyl acrylate and allyl methacrylate, the proportions of said member with respect to the butadiene and the acrylic monomer being up to 10% by weight, said graft polymer containing grafted branch chains derived from said mixture equaling 20 to 50% thereof by weight.

2. The graft polymer of claim 1, wherein said vinyl monomer is divinylbenzene.

3. The graft polymer of claim 1, wherein said vinyl monomer is tetraethyleneglycol dimethacrylate.

4. The graft polymer of claim 1, wherein said acrylic monomer is ethyl acrylate.

5. The graft polymer of claim 1, wherein said acrylic monomer is methyl methacrylate.

6. The graft polymer of claim 1, wherein 4 to 15% of the weight of the branch claims is derived from butadiene.

7. The graft polymer of claim 1, wherein 15 to 40% of the weight of the branch chains is derived from butadiene.

8. The graft polymer of claim 1, wherein said reaction occurs in the presence of a polymerization initiator.

9. A graft polymer, which comprises the graft polymer obtained by reacting a copolymer of vinyl chloride and at least one other ethylenically unsaturated compound copolymerizable therewith with a monomer mixture composed of about 20 to 80% by weight of butadiene and about 80 to 20% by weight of an acrylic monomer selected from the group consisting of alkyl acrylates and alkyl methacrylates, and a member of the group of vinyl and vinylidene monomers consisting of divinylbenzene, divinylether, monoalkyleneglycol dimethacrylate, polyalkyleneglycol dimethacrylate, monoalkyleneglycol diacrylate, polyalkyleneglycol diacrylate, allyl acrylate, allyl methacrylate in the presence of polymerization initiator, the proportions of said member with respect to the butadiene and the acrylic monomer being up to 10% by weight, said graft polymer containing grafted branch chains derived from said mixture equaling 20 to 50% thereof by weight.

10. A process for producing a graft polymer which comprises reacting (1) a polyvinyl chloride with a monomer mixture composed of about 20 to 80% by weight of butadiene and about 80 to 20% by weight of an acrylic monomer selected from the group consisting of alkyl acrylates and alkyl methacrylates, and a member of the group of vinyl and vinylidene monomers consisting of divinylbenzene, divinylether, monoalkyleneglycol dimethacrylate, polyalkyleneglycol dimethacrylate, monoalkyleneglycol diacrylate, polyalkyleneglycol diacrylate, allyl acrylate, allyl methacrylate in the presence of a graft polymerization initiator, the proportions of said member with respect of the butadiene and the acrylic monomer being up to 10% by weight, said graft polymer containing grafted branch chains derived from said mixture equaling 20 to 50% thereof by weight.

11. The process of claim 10, wherein said polymerization initiator is a catalyst.

12. The process of claim 10, wherein said polymerization initiator is ionizing radiation.

References Cited

UNITED STATES PATENTS

| | | | |
|---|---|---|---|
| 2,155,590 | 4/1939 | Garvey | 260—884 |
| 2,614,089 | 10/1952 | Harrison et al. | 260—879 |
| 2,983,657 | 5/1961 | Gabilly et al. | 204—159.17 |
| 3,119,786 | 1/1964 | Christen et al. | 260—879 |
| 3,121,672 | 2/1964 | Smith et al. | 260—884 |
| 3,157,713 | 11/1964 | Leese | 260—884 |

MURRAY TILLMAN, *Primary Examiner.*

GEORGE F. LESMES, *Examiner.*

UNITED STATES PATENT OFFICE
CERTIFICATE OF CORRECTION

Patent No. 3,330,886  July 11, 1967

Marcel Riou et al.

It is hereby certified that error appears in the above numbered patent requiring correction and that the said Letters Patent should read as corrected below.

Column 1, lines 25 and 26, strike out "in these ways it was possible in these ways to graft onto any type" and insert instead -- it was asserted it was possible to graft onto any type --; column 3, line 52, for "another", first occurrence, read -- one --; column 9, line 47, strike out the comma, third occurrence.

Signed and sealed this 25th day of June 1968.

(SEAL)
Attest:

Edward M. Fletcher, Jr.
Attesting Officer

EDWARD J. BRENNER
Commissioner of Patents